(12) United States Patent
Acero et al.

(10) Patent No.: US 8,351,589 B2
(45) Date of Patent: Jan. 8, 2013

(54) SPATIAL AUDIO FOR AUDIO CONFERENCING

(75) Inventors: Alejandro Acero, Bellevue, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 12/485,299

(22) Filed: Jun. 16, 2009

(65) Prior Publication Data

US 2010/0316232 A1    Dec. 16, 2010

(51) Int. Cl.
    *H04M 3/42* (2006.01)
(52) U.S. Cl. .............. 379/202.01; 709/204; 370/260
(58) Field of Classification Search ........... 379/202.01; 455/416
    See application file for complete search history.

(56) References Cited

U.S. PATENT DOCUMENTS

| | | | |
|---|---|---|---|
| 5,889,843 A | 3/1999 | Singer et al. | |
| 6,694,033 B1 | 2/2004 | Rimell et al. | |
| 7,346,654 B1 | 3/2008 | Weiss | |
| 2003/0129956 A1 | 7/2003 | Virolainen | |
| 2006/0104458 A1 | 5/2006 | Kenoyer et al. | |
| 2006/0133619 A1* | 6/2006 | Curry et al. | 381/26 |
| 2007/0263823 A1* | 11/2007 | Jalava et al. | 379/202.01 |
| 2008/0004866 A1* | 1/2008 | Virolainen et al. | 704/205 |
| 2008/0144794 A1 | 6/2008 | Gardner | |
| 2008/0260131 A1* | 10/2008 | Akesson | 379/202.01 |
| 2008/0298610 A1 | 12/2008 | Virolainen et al. | |
| 2010/0035593 A1* | 2/2010 | Franco et al. | 455/416 |

OTHER PUBLICATIONS

Tzekakis, et al., "Architectural Acoustics: Worship and Theatre Spaces", retrieved on Jan. 8, 2009 at <<http://link.aip.org/getpdf/servlet/GetPDFServlet?filetype=pdf&id=JASMAN000105000002001099000001&idtype=cvips&prog=normal>>, J. Accoust. Soc. Am., vol. 105, No. 2, Pt. 3, Feb. 1999, pp. 1043-1106.

* cited by examiner

*Primary Examiner* — Creighton Smith
(74) *Attorney, Agent, or Firm* — Lee & Hayes, PLLC

(57) ABSTRACT

Spatialized audio is generated for voice data received at a telecommunications device based on spatial audio information received with the voice data and based on a determined virtual position of the source of the voice data for producing spatialized audio signals.

20 Claims, 12 Drawing Sheets

SPATIAL AUDIO FOR AUDIO CONFERENCING

BACKGROUND

It is often necessary for multiple parties situated remotely from one another to communicate and collaborate with each other in a group setting. Various techniques exist to enable remote communication and collaboration between multiple parties, with one very common technique being audio conferencing, also frequently referred to as teleconferencing. Audio conferencing systems provide for a live exchange of audio information between two or more parties located remotely from one another and linked for audio communication by a communications network. Audio conferencing systems are frequently employed because of their ease of use, high reliability, and support for real-time communication and collaboration between multiple parties, up to a reasonably large number. Furthermore, audio conferencing is compatible with well-established global communications networks, such as ubiquitous public switched telephone networks, thus enabling participation in audio conferencing through the use of multiple different devices such as conventional landline telephones, mobile or cellular telephones, voice over IP phones, and specialized audio/video conferencing equipment.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for spatialization of audio communications received by a telecommunications device during an audio conferencing session.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Overview

Implementations disclosed herein provide audio spatialization techniques that are compatible with existing telephone networks and protocols. In some implementations, audio spatialization information is transmitted as part of the voice channel transmission. For example, audio spatialization information can be transmitted as an audio watermark added to the voice channel data, which is received by the telecommunications device and decoded for providing spatialization of audio data when the telecommunications device is a stereo-enabled device. The spatialization of the audio data can be performed based upon designated virtual locations of the participants to the audio conference for providing an illusion that the sound for a particular participant is coming from a particular direction corresponding to the designated virtual location of the particular participant. Further, these techniques are backwards compatible with existing telecommunications devices and protocols, such as with conventional landline telephones or other non-stereo telecommunications devices or telecommunications devices lacking sound-processing capability. The spatial audio information transmitted with the voice data can be made undetectable to human hearing, such as by encoding low-amplitude noise signals with the voice data prior to transmission of the voice data from an audio conferencing computing device to the telecommunications device. Because the added audio data is not audible to the human ear, the added audio data does not interfere with the clarity of the voice communication received by any of the telecommunications devices connected to the audio conference.

Figure 1:
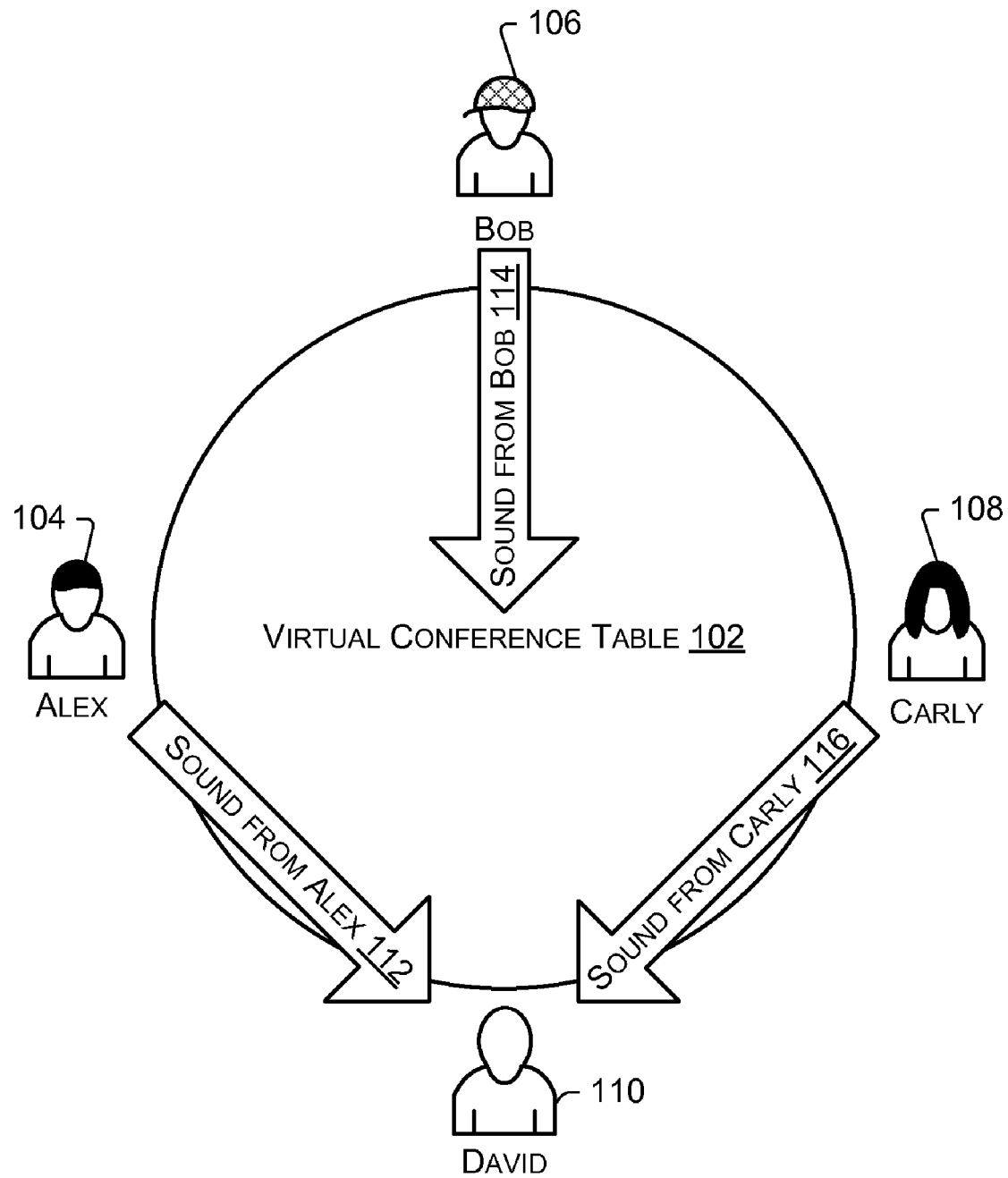
FIG. 1 illustrates an exemplary virtual audio conference according to some implementations disclosed herein.

FIG. 1 illustrates an example of a virtual conference table 102 according to some implementations herein. In the example of FIG. 1, there are four participants in an audio conferencing call, a first participant 104 (referred to hereafter as Alex), a second participant 106 (referred to hereafter as Bob), a third participant 108 (referred to hereafter as Carly), and a fourth participant 110 (referred to hereafter as David and also referred to as the listening participant). As illustrated in FIG. 1, in order to provide an illusion of realistic presence to the virtual conference, implementations herein provide for the sound of each participant's voice to appear the listening participant to come from a different respective position relative to the other participants. More specifically, with respect to sound heard by David, the sound of Alex's voice is made to appear to David to come from David's left side, as indicated by arrow 112, the sound of Bob's voice is made to appear to David to come from in front of David, as indicated by arrow 114, and the sound from Carly's voice is made to appear to David to come from David's right side, as indicated by arrow 116. By spatializing the sound from each participant in this manner to add direction to the sound, David is able to more naturally recognize which participant is speaking at any particular time during the audio conference, thereby adding to the effectiveness of communication during the audio conference. Further, the other participants 104, 106, 108 may also receive such spatialized audio with respect to the other three participants if their telecommunications equipment permits, as discussed further below.

As an exemplary implementation only, David may have a smart phone or similar telecommunications device having stereo earphones. Further, David has downloaded a spatial audio application or module to enable spatial audio on the smart phone during audio conferencing. The spatial audio application is able to decode audio using GSM or CDMA codecs, and then extract an audio watermark with a low bit rate (e.g., less than 10 bits per second). The audio watermark contains the identity of the speaker talking at that precise time. The spatial audio application generates left and right audio signals with different delays to create spatial audio that appears to come from a specific direction corresponding to a virtual position assigned to the speaker identified by the identity information included in the audio watermark. The spatial audio application can also have a graphic user interface (GUI) visually identifying positions of the participants to the audio conference, so that the angle of the direction of the spatial audio and the visual representations in the GUI match.

In other implementations, the spatialization calculations take place at an audio conferencing server or computing device, and the audio spatialization information is transmitted to David's smart phone in an audio watermark with the corresponding audio feed. The audio spatialization information can include difference information such as a time delay between the left and right audio channels which is received by the spatial audio application on David's smart phone and used to produce the left and right audio signal. Alternatively, the audio spatialization information transmitted in the watermark may include an absolute virtual position of the speaker, or a relative virtual angle or position of the speaker relative to a virtual position of David. Additional exemplary implementations are described below.

Exemplary Communications System

Figure 2:
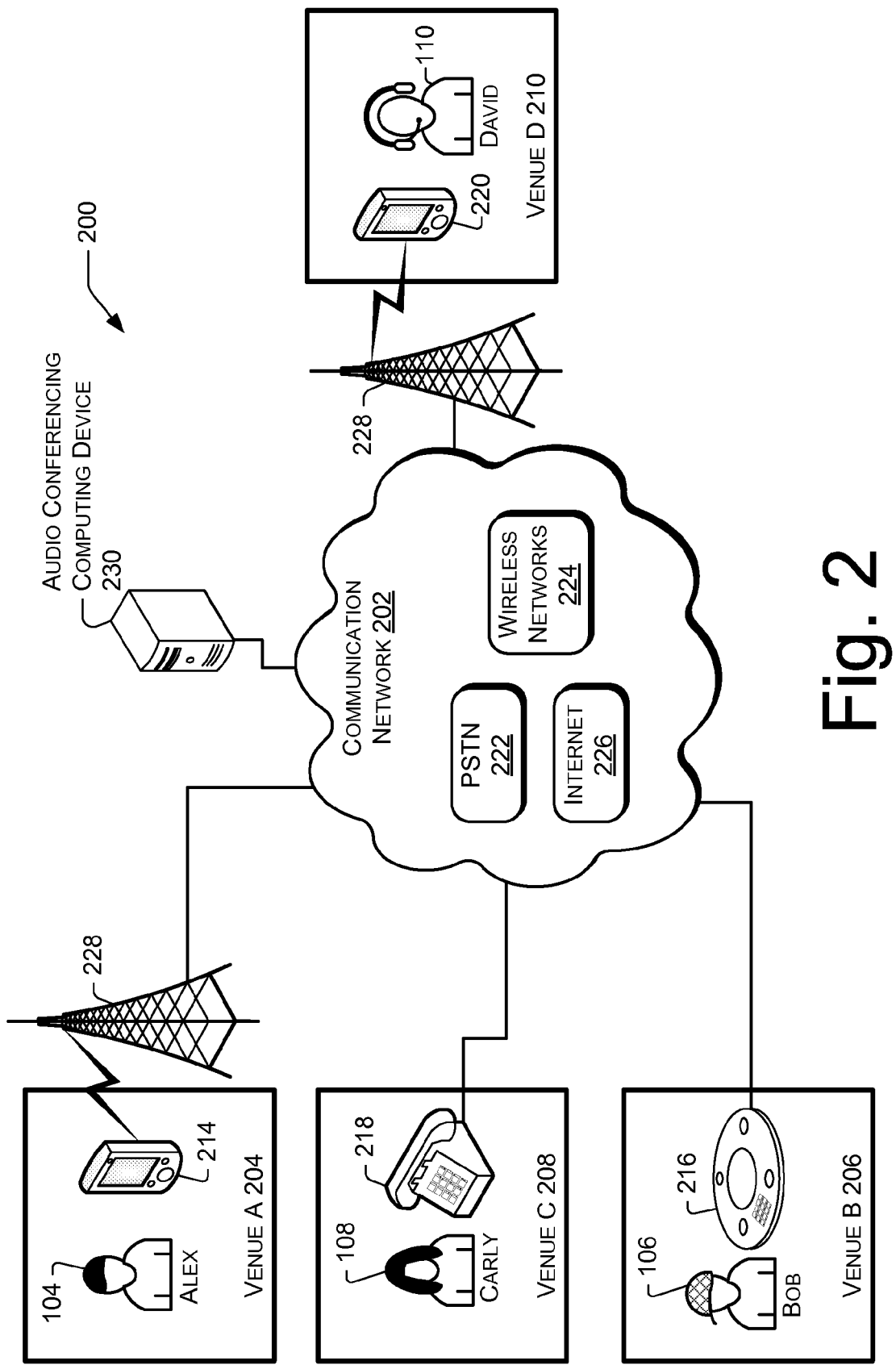
FIG. 2 illustrates an exemplary system and network configuration according to some implementations.

FIG. 2 illustrates a schematic view of an exemplary implementation of a communications system 200. The communications system 200 includes a communication network 202 for connecting each of the participants from a different location or venue. In this example, participant Alex 104 is located at a venue A 204, participant Bob 106 is located at a venue B 206, participant Carly 108 is located at a venue C 208, and participant David 110 is located at a venue D 210. Each participant includes a telecommunications device for enabling participation in audio conferencing. In this example, Alex has a mobile telecommunications device 214, such as a cellular phone, smart phone, or the like, Bob has a specialized teleconferencing phone 216, Carly has a conventional landline phone 218, and David has a mobile telecommunications device 220, such as a cell phone, smart phone, or the like, that includes stereo audio capability. Furthermore, while certain examples of particular types of telecommunications devices are illustrated in this example, it should be understood that a variety of other telecommunications devices may also be used with the implementations herein.

The communication network 202 can include a variety of components for enabling proper operation and communication between the telecommunications devices 214-220. For example, the communication network 202 may include a circuit-switched telephone networks, such as a Public Switched Telephone Network (PSTN) 222. Thus, communication network 202 is able to communicate with landline telephones via the PSTN 222. The communication network further can include a plurality of wireless communication networks 224 maintained by a plurality of different wireless network service providers. In this example, the wireless communications infrastructure includes a plurality of base stations 228 for communicating with telecommunications devices 214, 220 using cellular-based communication protocols such as GSM (Global System for Mobile communication), UMTS (Universal Mobile Telecommunications System), CDMA (Code Division Multiple Access), D-AMPS (Digital Advanced Mobile Phone System), TDMA (Time Division Multiple Access), iDEN (Integrated Digital Enhanced Network), GPRS (General Packet Radio Service), EDGE (Enhanced Data rates for GSM Evolution), WCDMA (Wideband Code Division Multiple Access), and their variants. The wireless communication networks 224 may also enable the telecommunications devices to communicate via a peer-to-peer or ad hoc system utilizing appropriate communication protocols such as Bluetooth®), IEEE 802.11, IEEE 802.16, and the like.

Communication network 202 may also include or be in communication with the Internet 226. Thus, in some implementations or situations, the mobile communication devices 102, 108 can access the Internet 118 through cellular radio communications, such as via EVDO (Evolution-Data Optimized) communications or other technologies. In other implementations or situations, mobile communication devices 214, 220 can access the Internet 118 directly, such as via a wireless access point using Wi-Fi, WiMax, or the like. Further, communication network 202 may use any of a variety of protocols and configurations to enable a plurality of telecommunications devices to access other telecommunications devices for enabling communication between a variety of telecommunications devices, such as conventional landline phones, wireless and cellular phones, data and voice over IP (VOIP) devices, and the like. Accordingly, implementations disclosed herein for providing spatial audio are compatible with all of these telecommunications devices. However, it should be noted that certain telecommunications devices, such as conventional landline phones, that do not support stereo audio and sound processing capability will not benefit from the spatial audio techniques described herein.

In the implementation illustrated in FIG. 2, an audio conferencing computing device 230 is in communication with communication network 202 or forms a part of communication network 202. Audio conferencing computing device 230 typically is a server or other management computer provided by, for example, a network service provider, a telephone company, a business, or the like, to enable the creation and management audio conferences. For instance, when one of the participants wants to set up an audio conference, the participant might obtain a call-in number for the audio conference, and instruct the other participants to call the call-in number at the appointed time. The audio conferencing computing device 230 receives the calls from the participants, connects them to each other, and manages the audio conference. In another example, one of the participants might sequentially call the other participants using a conferencing feature on his or her telecommunications device, and the audio conferencing computing device 230 then enables and manages the audio conference.

One advantage that mobile telecommunications devices 214, 220 have over landline devices 216, 218, is the ability to communicate in other manners in addition to voice communication. For example, in some implementations herein, an SMS (short message service) text message can be sent from one of the telecommunications devices 214 or 220 to audio conferencing computing device 230 to set up the audio conference. The SMS message can include information such as desired time of the audio conference, number of participants, names of participants, and the like. This information can then be used by the audio conferencing computing device 230 for automatically establishing the audio conference. Further, this information can also, in some implementations, be used for subsequently managing spatial audio during the audio conference, as will be discussed in additional detail below.

Additionally, the audio conferencing computing device 230 can then send SMS messages to the other participants to notify or remind them of the scheduled audio conference, provide them with the time and number to call in to, and the like. For those participants having landline phones or other telecommunications devices not capable of receiving SMS messages, this information can be transmitted by email, automated voice mail, through a cell phone data channel, such as at a WiFi hotspot, or other suitable methods. Thus, implementations herein can greatly simplify conference scheduling from a user interface point of view. For example, the audio conferencing computing device 230 can send an SMS message to each participant having a smart phone or similar telecommunications device with all the scheduling information for the conference call included in the SMS message. If that smart phone has the spatial audio module described herein installed, the conferencing information can be automatically stored and integrated with the user's calendar with a click of a button. The module can also automatically alert the user when the time for the conference arrives, and initiate the call to connect to the conference with a single button. Thus, implementations herein enable greater ease of use than merely receiving an email with an audio conference phone number and passcode, and having the user enter all those numbers by hand.

Exemplary Telecommunications Device Architecture

Figure 3:
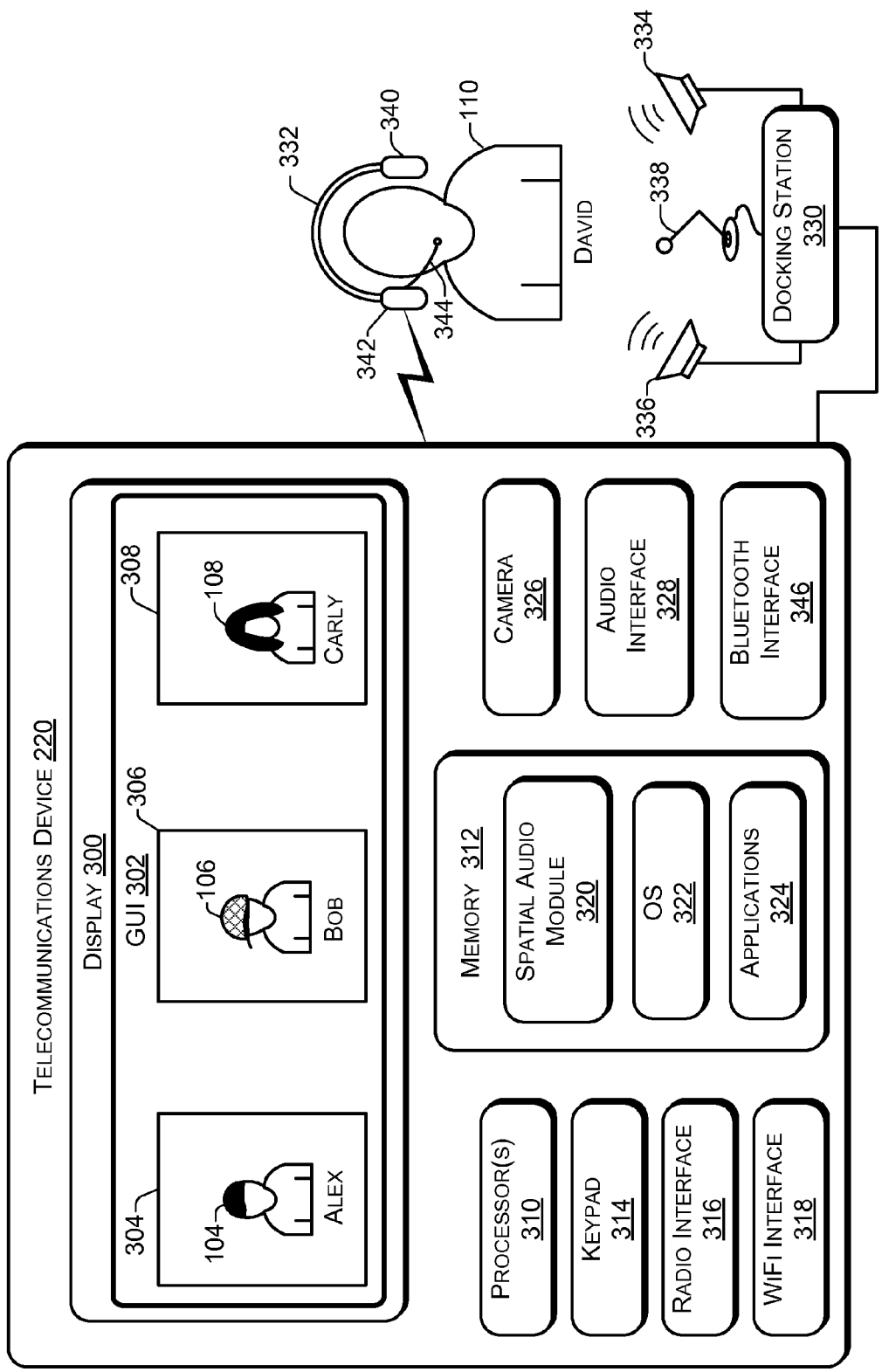
FIG. 3 illustrates an exemplary telecommunications device according some implementations.

FIG. 3 illustrates an exemplary configuration of telecommunications device 220 which can be used to implement processes and techniques disclosed herein. Telecommunications device 214 of FIG. 2 may be similarly configured. Telecommunications device 220 includes a display 300 for displaying information regarding participants in an audio conference. For example, display 300 may display an image and/or name and/or telephone number and/or other identifying information of each participant in the audio conference. In the illustrated example, a graphic user interface (GUI) 302 is presented on display 300 and includes an image and name of participant Alex displayed as participant information 304 on the left, an image and name of participant Bob 106 is displayed as participant information 306 in the center, and an image and name of participant Carly 108 is displayed as participant information 308 on the right. Spatial audio can be produced by the telecommunications device 220 based on the particular order in which the participants are displayed. Further, it should be noted that while having the images of the participants 104-108 displayed on the telecommunications device 220 adds to the audio conferencing experience, in other implementations, it is not necessary to have the images or other participant information displayed, and spatial audio locations for each participant can be established based on other criteria or at random.

Display 300 may be a liquid crystal display, or any other type of display commonly used in mobile telecommunications devices. In some embodiments, display 300 may be a touch screen, and graphic user interface 302 may be touch-screen enabled. For example, the user may adjust the relative positions of the participant information 304-308 by touching and dragging the images, icons etc., to a new location. The spatial audio generated for the participants may then be modified accordingly.

In addition, telecommunications device 220 has one or more processors 310, a memory 312, and a keypad 314. Memory 312 generally includes both volatile memory and non-volatile memory (e.g., RAM, ROM, Flash Memory, miniature hard drive, memory card, or the like). Keypad 316 may be a push button numeric dialing pad (such as on a typical telephone), a multi-key keyboard (such as a conventional QWERTY keyboard), or the like, and may also include a joystick-like controller and/or designated navigation buttons, or the like. Additionally, or alternatively, when display 300 is a touch-sensitive touch screen, display 300 can then also act as an input device, such as for providing a soft-key keyboard, navigation buttons, or the like.

Telecommunications device 220 also includes a cellular radio interface 316 that performs the function of transmitting and receiving radio frequency communications. The cellular radio interface 316 facilitates wireless connectivity between telecommunications device 220 and the various cell towers and base stations operated by various network service providers, such as with any of the protocols described above. Telecommunications device 220 also may include a wireless LAN (Wi-Fi) interface 318 that performs the function of transmitting and receiving wireless communications using the IEEE 802.11 and/or 802.16 standards. For example, telecommunications device 220 can use Wi-Fi interface 316 to communicate directly with a nearby wireless access point such as for accessing a data channel on the Internet directly without having to perform the access through the network service provider's network.

Telecommunications device 220 includes a spatial audio module 320 which is resident in memory 312 and which is executed by processor(s) 310 for carrying out implementations described herein for producing spatial audio, generating GUI 302, and other functions, as described in additional detail below. Also resident in memory 312 is an operating system (OS) 322 that controls operations on telecommunications device 220, and one or more application programs 324. For example, transmissions to and from the radio interface 316 can be conducted under control of the operating system 322. The application programs 324 are run by OS 322. Examples of application programs 324 in implementations herein may include email programs, PIM (personal information management) programs, Internet browser programs, and so forth.

Telecommunications device 220 also may include a camera 326 for taking video and/or still photographs using telecommunications device 220. For example, the user of the telecommunications device 220 may take an image of himself/herself with camera 326 and transmit the image as an MMS (multimedia message service) message to those other participants of the audio conference that have telecommunications devices capable of receiving MMS messages and spatial audio. The spatial audio module 320 on these telecommunication devices can then place on the GUI 302 the image of the each participant that has submitted an image as part of that participant's displayed information.

Telecommunications device 220 also includes an audio interface 328 that is used to provide stereo audio signals to and receive verbal input signals from the user of telecommunications device 220. For example, the telecommunications 220 device may have one or more built-in speakers and microphones (not shown), as is known to facilitate a telephone conversation. In implementations herein, telecommunications device 220 has stereo sound output capability. For example, telecommunications device 220 may be connected to a stereo docking station 330 or a stereo headset 332 for providing a user with spatialized stereo sound. Stereo docking station 330 includes a left channel speaker 334 and a right channel speaker 336 enabling listening participant David 110 to receive spatial audio. Docking station 330 further may include a microphone 338 for enabling participant David to talk more conveniently to the other participants 104, 106, 108. Alternatively, participant David may wear stereo headset 332 during the audio conference. Stereo headset 332 includes a left channel speaker 340, a right channel speaker 342 and a microphone 344. Stereo headset 332 may be wired or wireless. For example, stereo headset may be a wired earbud-style headset with a microphone built in to the wire, as is commonly available for use with conventional stereo-enabled cellular phones. Additionally, as another example, telecommunications device 220 also may include a Bluetooth® interface 346 that performs a function of transmitting and receiving Bluetooth® radio communications. Stereo headset 332 may be wirelessly connected for communication with telecommunications device 220 via Bluetooth® interface 346. Further, Bluetooth® interface 346 may be used for other functions, as is known in the art, such as enabling direct communication between telecommunications device 220 and other nearby devices that are also Bluetooth® enabled.

In addition, while various components, features, and functions of telecommunications device 220 have been described in the implementation illustrated in FIG. 3, it should be understood that numerous other configurations, components, features, and the like may be incorporated into telecommunications devices described herein, and that the implementations herein are not limited to any particular configuration for telecommunications devices.

Exemplary Audio Conferencing Computing Device

Figure 4:
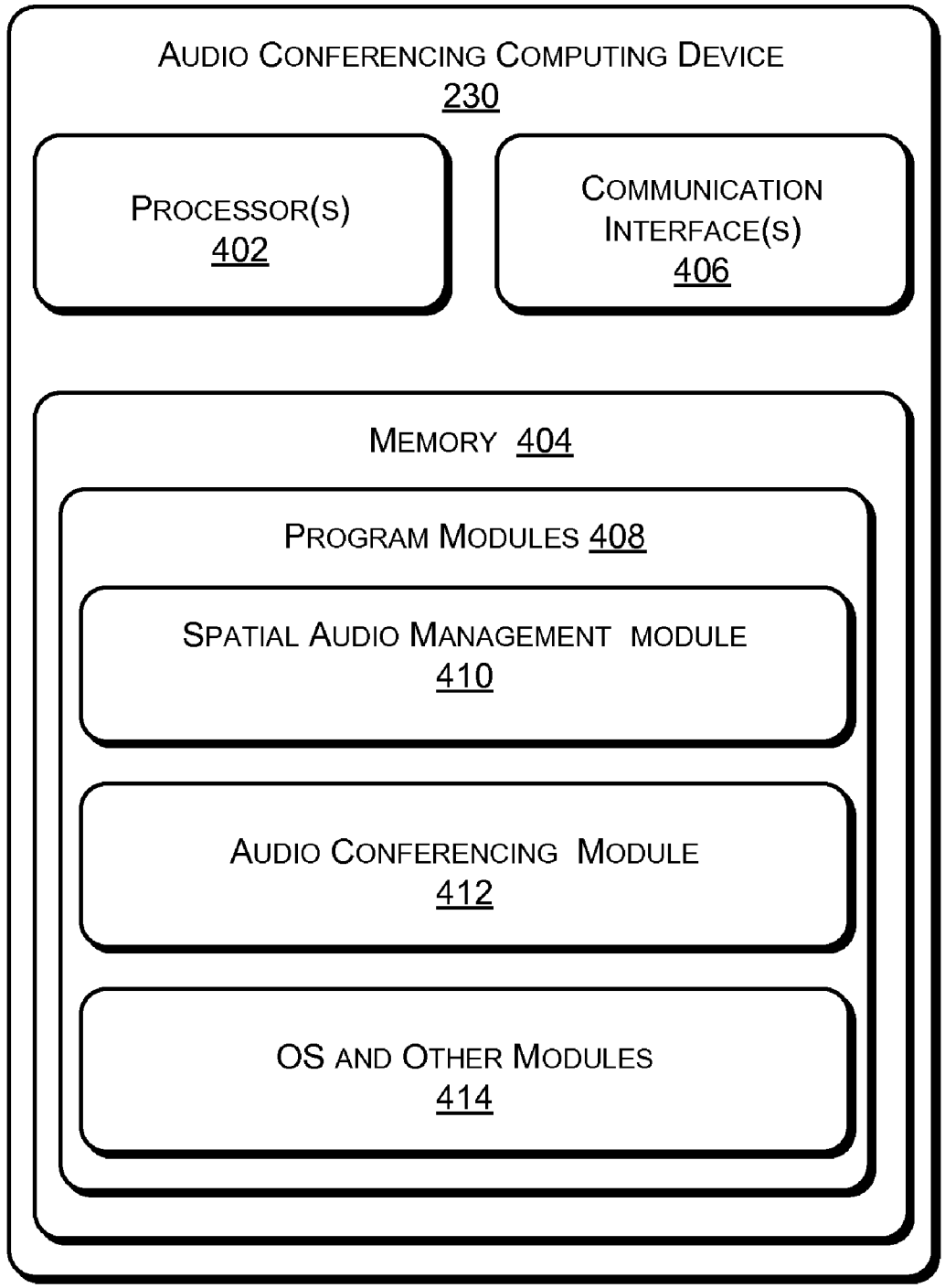
FIG. 4 illustrates an exemplary audio conferencing computing device according to some implementations.

FIG. 4 illustrates an exemplary logical and hardware configuration of audio conferencing computing device 230. In the illustrated example, audio conferencing computing device 230 includes one or more processors 402, a memory 404, and one or more communication interfaces 406. The one or more processors 402 can be a single processing unit or a number of processing units, all of which could include multiple computing units. The processor(s) 402 may be implemented as one or more microprocessors, microcomputers, microcontrollers, digital signal processors, central processing units, state machines, logic circuitries, and/or other devices that manipulate signals based on operational instructions. Among other capabilities, the processor(s) 402 can be configured to fetch and execute computer-readable instructions stored in the memory 404 or other computer-readable storage media, mass storage device, or the like, for carrying out functions described herein.

The memory 404 can include any computer-readable storage media known in the art including, for example, volatile memory (e.g., RAM) and/or non-volatile memory (e.g., flash, etc.), mass storage devices, such as hard disk drives, solid state drives, removable media, including external and removable drives, or the like. The memory 404 stores processor-executable program instructions or code, such as programs, modules, or the like, that can be executed by the processor(s) 402 for carrying out the services, methods and functions described herein.

The communication interface(s) 406 facilitate communication between the audio conferencing computing device 230 and multiple telecommunications devices, such as telecommunications devices 214-220 of FIG. 2. For example, the communication interface(s) 406 may include one or more circuits or ports for connecting to and enabling communication between a number of telecommunications devices during audio conferencing such as for transmitting voice communications through the PSTN 222. Further, as mentioned above, the communication interface(s) 406 can also facilitate communications within a wide variety of other networks and protocol types, including wired networks (e.g., LAN, cable, etc.) and wireless networks (e.g., WLAN, cellular, satellite, etc.). In one implementation, the audio conferencing computing device 230 can receive SMS messages, MMS messages, email messages, or the like, process these messages, and take corresponding action, such as setting up a conference call for a specified time, creating and sending SMS messages and MMS messages to participants of the conference call, sending emails to participants of the conference call, or the like.

Memory 404 includes a plurality of program modules 408 stored therein and executable by processor(s) 402 for carrying out implementations herein. Program modules 408 include a spatial audio management module 410 for providing spatial audio information to participants of an audio conference and an audio conferencing module 412 for carrying out audio conferencing functions. For example, spatial audio management module 410 may be a part of audio conferencing module 412, or may be a separate module that interacts with audio conferencing module 412. Memory 404 also includes an operating system and other modules 414, such as communication software, drivers, and the like. Further, other possible configurations for audio conferencing computing device 230 will be apparent to those of skill in the art in light of the disclosure herein, and thus, implementations disclosed herein are not limited to the particular example illustrated.

Spatial Audio Management Module

Figure 5:
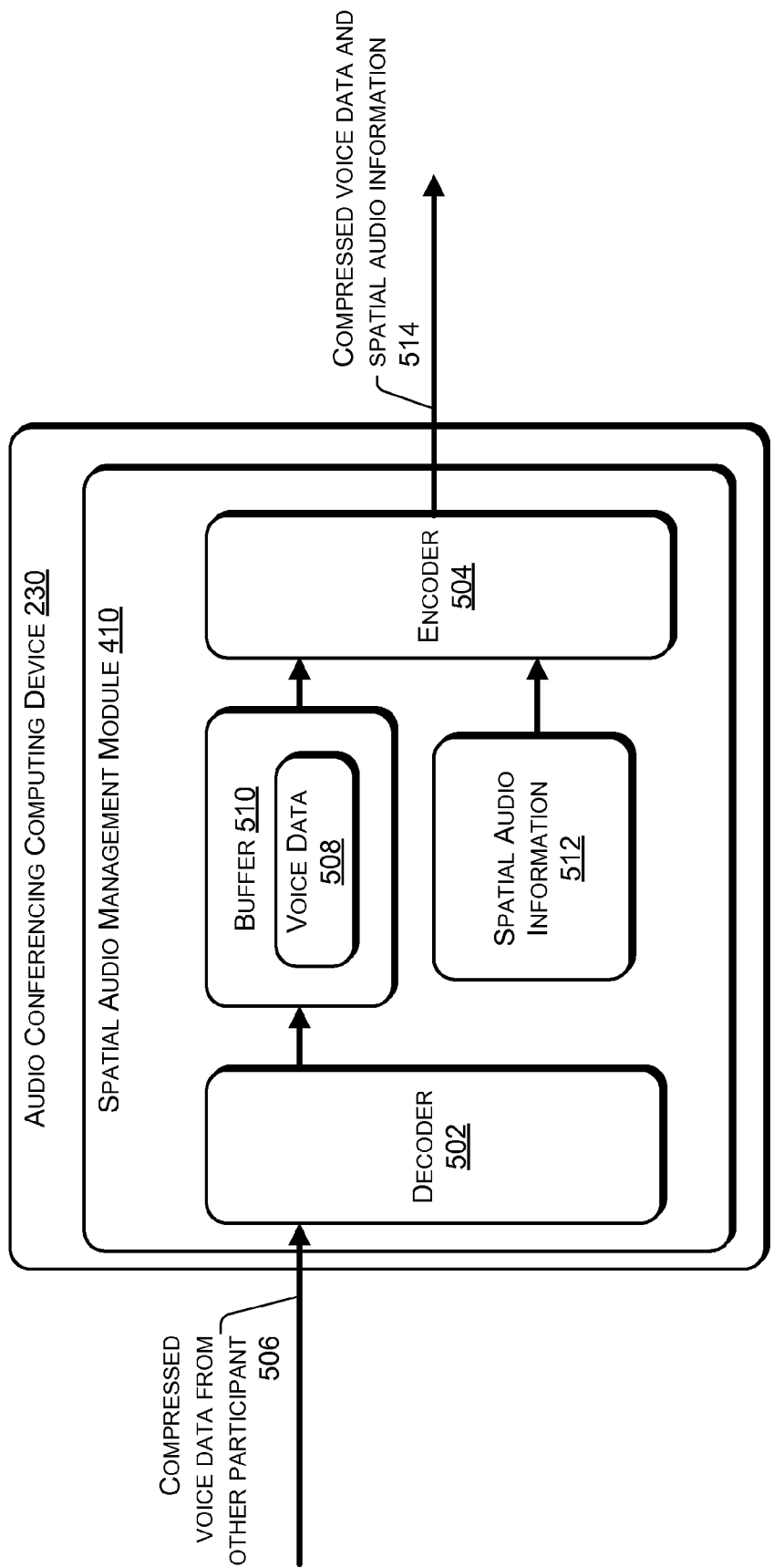
FIG. 5 illustrates a conceptual diagram of an exemplary implementation of a spatial audio management module functionality.

FIG. 5 illustrates an exemplary conceptual block diagram illustrating a configuration and functionality of spatial audio management module 410 of audio conferencing computing device 230. In this example, spatial audio management module 410 includes a decoder 502 and an encoder 504 as part of a codec (coder-decoder) employed on audio conferencing computing device 230. During an audio conference, decoder 502 receives compressed voice data 506 from the participants of the audio conference for transmission to the other participants of the audio conference. The spatial audio module 410 decompresses the compressed voice data 506 to produce voice data 508 that is temporarily stored in a buffer 510. Further, spatial audio management module 410 determines the identity of the participant that the voice data 508 is received from. The identity of a speaker may be determined using any of various methods. For example, when a specific phone number is called, a circuit is established for the call, and the audio conferencing computing device 230 is able to distinguish the circuits of each of the participants to the audio conference. Furthermore, if a participant just sends an SMS message with a request to start the conference, the audio conferencing computing device 230 can call the participant, and a circuit is established for that participant in that manner. Additionally, when a particular participant speaks, the audio conferencing computing device 230 detects that the particular participant is speaking based upon a measured intensity or detected loudness of the voice signal received on the circuit for that particular participant, as compared to a normal background noise that is received on circuits of other participants that are not speaking.

In addition, in some implementations, audio conferencing computing device 230 also performs the audio spatialization calculations. In these implementations, the position of the speaking participant that is the origin of the voice data 508 may also be determined relative to the listening participant that will receive the spatial audio data. Spatial audio information 512 is produced by the spatial audio management module 410 based upon these determinations, and the spatial audio information 512 is encoded and transmitted with the voice data 508 to the listening participant receiving the spatial audio data. In some implementations, the spatial audio information 512 is added to the voice data 508 by encoder 504 during compression of the voice data 508 as an audio watermark to produce compressed voice data and spatial audio information 514, which is then transmitted over the network to the participant receiving the spatial audio data. Thus, the implementations using audio watermarks are backwards compatible with existing telecommunications infrastructure, and if a device does not have a suitable codec to extract the watermark information, and/or is not stereo-enabled, the mono audio received by the device is not affected, and the user of the device is able to participate in the audio conference in a conventional manner.

As is known in the art, voice communications are compressed for transmission over the communications network and then decompressed when received. For example, the frequency range produced by the human voice generally ranges from approximately 30 to 18,000 Hz. However, when the current public switched telephone networks were originally designed, it was determined that a listener did not need to hear the entire range of frequencies that make up the human voice to understand the words being spoken. Because most of the energy necessary for intelligible speech is contained in a band of frequencies between 0 and 4000 Hz, this range was defined as the voice channel used in the public switched telephone networks.

Conventionally, to eliminate noise from the voice signal, the signal is filtered with a band-pass filter to remove any frequency below 300 Hz and above 3400 Hz. For instance, when the telephone infrastructure was originally designed, telephone lines were not able to transmit analog signals as well in the region below 300 Hz, and crosstalk could occur in the region above 3400 Hz when many conversations were sharing the same wire. The band-pass filter allows voice carriers to reduce noise in a conversation because any signal outside the voice channel is discarded. However, according to implementations herein, these frequencies below 300 Hz and/or above 3400 Hz can be used to embed an audio watermark that contains information that can be transmitted with the voice data over the public switched telephone networks without affecting the quality of the communication. Furthermore, other audio watermarking techniques may also be used, such as spread spectrum type watermarking; however, these techniques tend to be more processor intensive.

In some implementations herein, audio conferencing computing device 230 sends just the identification information of the speaking participant as the spatial audio information in the audio watermark. The identification information identifies which participant is the origin of the voice signal that the watermark accompanies. When the telecommunication device receives the identification information with the voice data, the spatial audio module on the telecommunications device performs the calculations to determine the differences between the left and right audio channels to produce the spatial audio. This may performed by imposing a time delay on one of the channels, as discussed below. Thus, an advantage this implementations is that less data is required to be transmitted in the watermark, but a disadvantage is that the telecommunications device must perform all the spatial audio calculations.

In other implementations, audio conferencing computing device 230 determines the virtual positions of the participants relative to each other and calculates the difference between the left and right audio channels for producing the desired spatial audio effect to cause the audio to appear to come from a corresponding particular direction. The audio conferencing computing device 230 then embeds this difference information as the spatial audio information in the audio watermark transmitted with the monaural voice data to the spatial-audio-enabled telecommunications device of the listening participant. For example, the spatial audio information included in the watermark can be time delay information for one of the channels, relative angle or relative or absolute position information, or the like, as discussed below.

Figure 6:
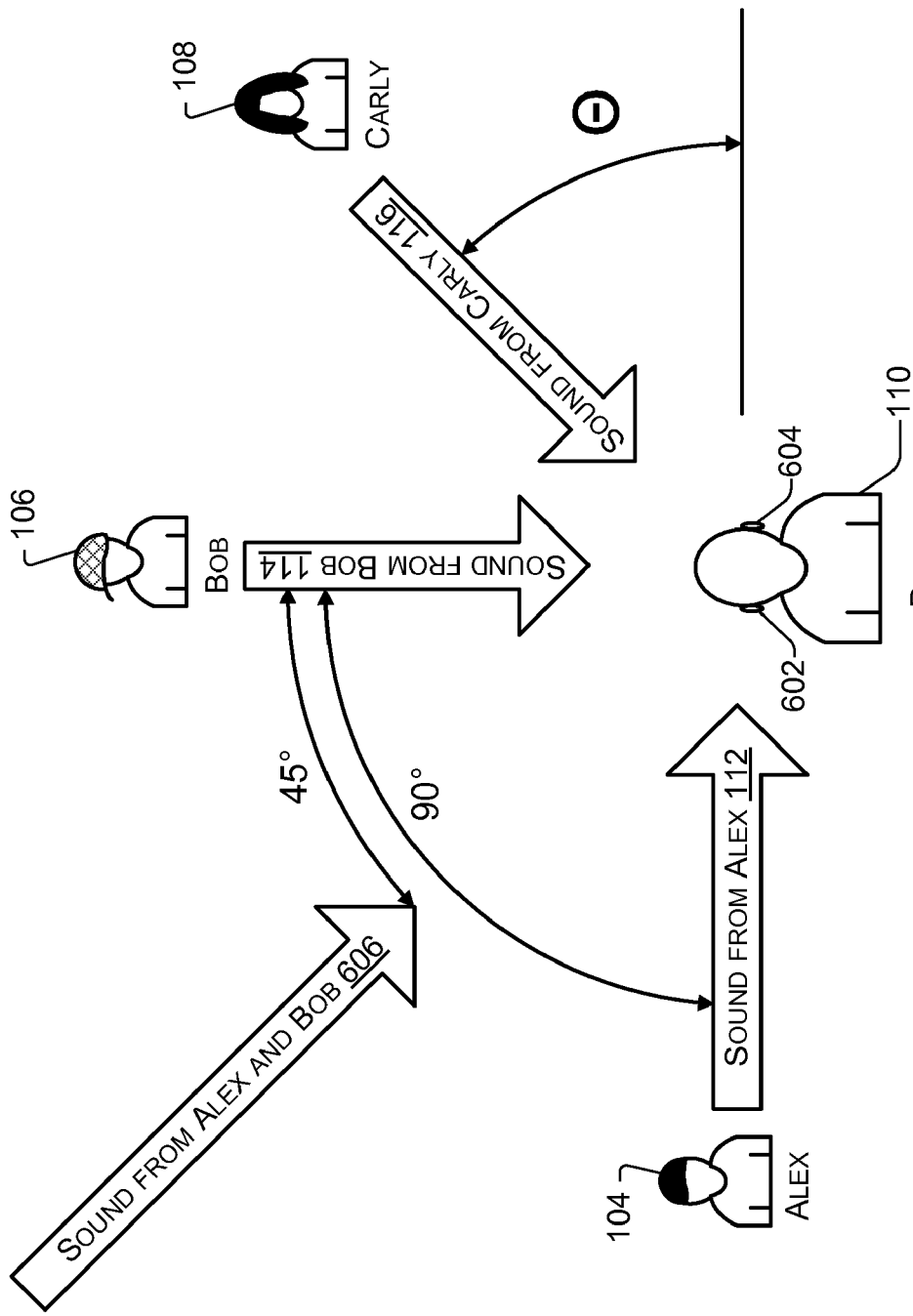
FIG. 6 illustrates an exemplary diagram depicting spatial audio sound perception according to some implementations

Methods for calculating spatial audio are well known in the art, and are typically based upon imposing a time delay on of one of the audio channels. For example, as illustrated in FIG. 6, by controlling the timing at which each of the left and right audio channels is delivered to the left ear 602 and right ear 604, respectively, of listening participant David 110, an illusion can be created to cause participant David 110 to perceive the audio as coming from a particular direction. It may be seen from FIG. 6, that the timing at which the sound of any particular participant's voice reaches the left ear 602 and the right ear 604 will differ depending on the desired virtual location of the participant.

In an actual conference setting with seating positions configured according to FIG. 6, the sound from Alex 112 will reach David's left ear 602 first, and then his right ear 604 at some point in time later. On the other hand, the sound from Bob 114 will reach David's left ear 602 and right ear 604 at approximately the same time. The sound from Carly 116, will reach David's right ear 604 first, and then David's left ear 602 at some later point, but the time difference is not as great as for Alex. Thus, the desired angle or direction that the sound should appear to be coming from can be calculated based upon this explanation. For example, spatialized sound for Carly's virtual position can be calculated based upon an angle θ, and a calculated distance from Carly's virtual position to each of David's left ear 602 and right ear 604. Thus, a simplified calculation for determining the time delay between the right channel and left channel would be the difference in these distances to the left ear 602 and the right ear 604 divided by the speed of sound. Other more complex spatial audio calculations are known in the art, and could also be used for performing the spatial audio calculations herein, such as, for example, also reducing the volume or gain of one of the audio channels. Thus, the invention is not limited to any particular method for determining the difference information between the left channel and the right channel, or otherwise producing the spatial audio effects.

Additionally, the participants may be automatically virtually arranged in an equally spaced manner in a semi circle around the receiving participant David 110. For example, in the case of three participants, participant Bob 106 may be virtually located directly in front of participant David 110, while participant Alex 104 and participant Carly 108 may be virtually located 90° to either side of Bob. However, in other implementations, the participants may be virtually located in other positions, which may be controlled by the GUI 302 on the telecommunications device 220. For example, as illustrated in FIG. 6, Bob may be located in front, Alex at 90° to the left of Bob, and Carly at some other angle to the right of Bob by adjusting the GUI 302. Furthermore, as discussed above, the positions of each participant may be changed or rearranged during the audio conference using the GUI 302, and the spatial audio for each participant adjusted accordingly. Also, while the semi circle configuration conforms most closely to typical expectations of a virtual conference, in other implementations, one or more participants may be virtually located behind, above, or below the listening participant David, and the spatial audio adjusted accordingly.

Furthermore, it may occur that two of the participants speak simultaneously. For example, in FIG. 6, if participant Alex 104 and participant Bob 106 speak simultaneously, the sound produced by each is mixed together in a single monaural voice data communication. In such an occurrence, it would be difficult to separate the sound from Alex 112 and the sound from Bob 114 after the sound has been mixed together, and therefore, spatial audio cannot be properly applied to the individual sounds produced by each of Alex and Bob. However, in implementations herein, as a compromise, the mixed sound can be spatialized to appear to come from a direction midway between the two participants that are talking simultaneously, which in the illustrated example is at a 45° angle between Alex and Bob, as indicated by arrow 606. For example, the identities of both Alex and Bob can be transmitted in the audio watermark and the compromise angle calculated at the receiving telecommunications device. In other implementations, the position information can be transmitted in the watermark, as a relative or absolute position.

Alternatively, when two or more speakers are talking simultaneously, the signals for the two speakers can be sent as a stereo signal to the listening party so that the receiver spatializes the two signals properly. Transmitting true stereo audio entails transmitting left plus right (L+R) audio signals in the monaural channel (i.e., the voice channel) and L−R audio signal in the watermark. The receiving telecommunications device can then reconstruct the L audio signal and the R audio signal separately from L+R and L−R. However, it should be noted that transmitting L−R (spatial audio difference information) in the watermark requires a much higher bandwidth than is the case in where, for example, only the identity of the speaker or time delay information is transmitted. Thus, the results obtained using this alternative are dependent upon the bandwidth able to be transmitted in the audio watermark without causing noise in the monaural voice channel and the compression of the L−R signal. For instance audio watermarks of up to 300 bps are possible, and thus the L−R signal may need to be compressed to under 300 bps to avoid producing noise.

Additionally, the audio processing can also be different depending on whether the sound output is from headset 332 or external speakers 334, 336. For example, with respect to the sound from Alex 112, a simple method would be to just have this sound produced by the left external speaker and have no audio signal input to the right external speaker. However, in the case in which listening participant David is wearing a headset 332, having the sound come only out of the left headset speaker would sound unnatural. Accordingly, numerous additional variations for producing spatialized audio effects will be apparent to those of skill in the art in light of the disclosure herein.

As mentioned above, in some implementations, the spatial audio calculations are carried out at the telecommunications device, and the audio conferencing computing device 230 only transmits as the spatial audio information the identity of the participant that is currently speaking, i.e., the origin of the corresponding voice data. In these implementations, the amount of data transmitted in the watermark is substantially less; however the processing requirements placed on the telecommunications device are increased, as mentioned above.

Furthermore, in other implementations, the calculations for producing spatial audio are carried out at the audio conferencing computing device 230 by spatial audio management module 410. Thus, in these implementations, the spatial audio information transmitted includes the calculated time delay to be applied to one of the audio channels, or other differences between left and right audio channels to be applied by the spatial audio module 320 at the telecommunications device 220. Because only the difference information is required to be transmitted as the spatial audio information in the audio watermark, the amount of data to be transmitted is still sufficiently small as to be inaudible in the voice communication. For example, it is desirable to maintain the amount of watermark data below some upper limit, such as, for example, 300 bits per second so that the watermark data does not produce noise in the voice communication, particularly on phones without data processing capability, such as conventional landlines.

In addition, implementations herein are described in terms of stereo or dual-channel audio, i.e., a left and right channel. However, it will be appreciated that the techniques described herein can also be applied to multiple channel audio formats such as 5.1, 7.1, or the like. Further, while the examples herein illustrate three participants 104-108 in addition to the listening participant 110, it will be appreciated that any number of participants can be accommodated using the principles taught herein.

Additionally, in other implementations, the spatial audio information can be sent with the voice communication by techniques other than an audio watermark. For example, the spatial audio information may be sent as an accompanying SMS message received and automatically processed by the spatial audio module 320. Alternatively, if a separate data channel is available between the audio conferencing computing device 230 and the telecommunications device 220, the spatial audio information can be sent over the separate data channel and received by the spatial audio module 320.

Spatial Audio Module

Figure 7:
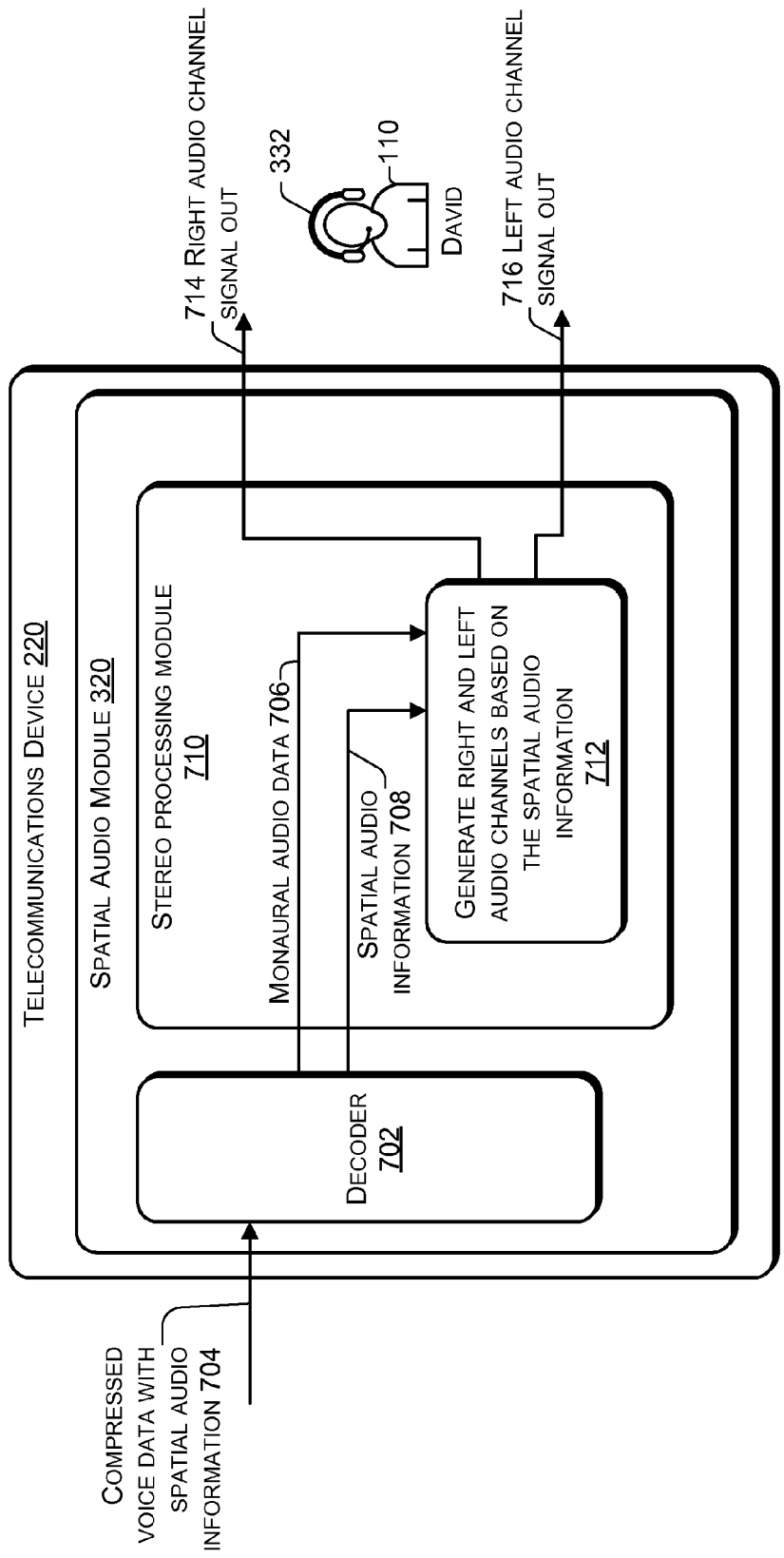
FIG. 7 illustrates a conceptual diagram of a spatial audio module functionality according to some implementations.

FIG. 7 illustrates an exemplary conceptual block diagram of a configuration of spatial audio module 320 of telecommunications device 220. Spatial audio module 320 includes a decoder 702 that is part of a codec on telecommunications device 220. Decoder 702 receives the compressed voice data with spatial audio information 704 from the audio conferencing computing device 230, and decodes this to produce monaural audio data 706 and spatial audio information 708, which is provided to a stereo processing module 710. For example, the spatial audio information may be encoded with the voice data as an audio watermark, as described above, and the decoder 702 then detects the watermark and decodes the information included therein. At block 712, stereo processing module 710 generates the right and left audio channel signals from the monaural audio data 706 based upon the spatial audio information received with the compressed voice data. The right audio channel signal 714 and the left audio channel signal 716 are then output to a stereo sound producing component such as headphones 332 or speakers 334, 336 of FIG. 3.

As discussed above, in some implementations, where the watermark data includes only an identification of the participant to the conference call that is the origin of the corresponding monaural audio data, the stereo processing module must also determine the spatial audio effects to be applied to the monaural audio data 706 based upon the provided identity and the virtual position assigned on the telecommunications device to the identified participant. In other implementations, the spatial audio information 708 includes difference information between the left audio channel and the right audio channel, such as a time delay to be applied to one of these channels. Stereo processing module 710 then applies this difference information to the monaural audio data 706 to produce the right and left audio channel output signals 714, 716. For example, one of the audio channels may be delayed by a determined number of milliseconds, have the gain reduced, or the like.

Thus, from the foregoing, it may be seen that implementations herein enable spatial audio to be provided on telecommunications devices that are stereo enabled and capable of performing sound processing. It should be noted, however, that the compressed voice data with embedded audio watermark that is delivered to the telecommunications device is fully backward compatible (i.e., bit-compatible) with all other types of landlines and other telecommunications devices currently enabled on the public switched telephone networks, without requiring any modifications to the telecommunications devices or protocols used.

Two-Way Information Exchange

Figure 8:
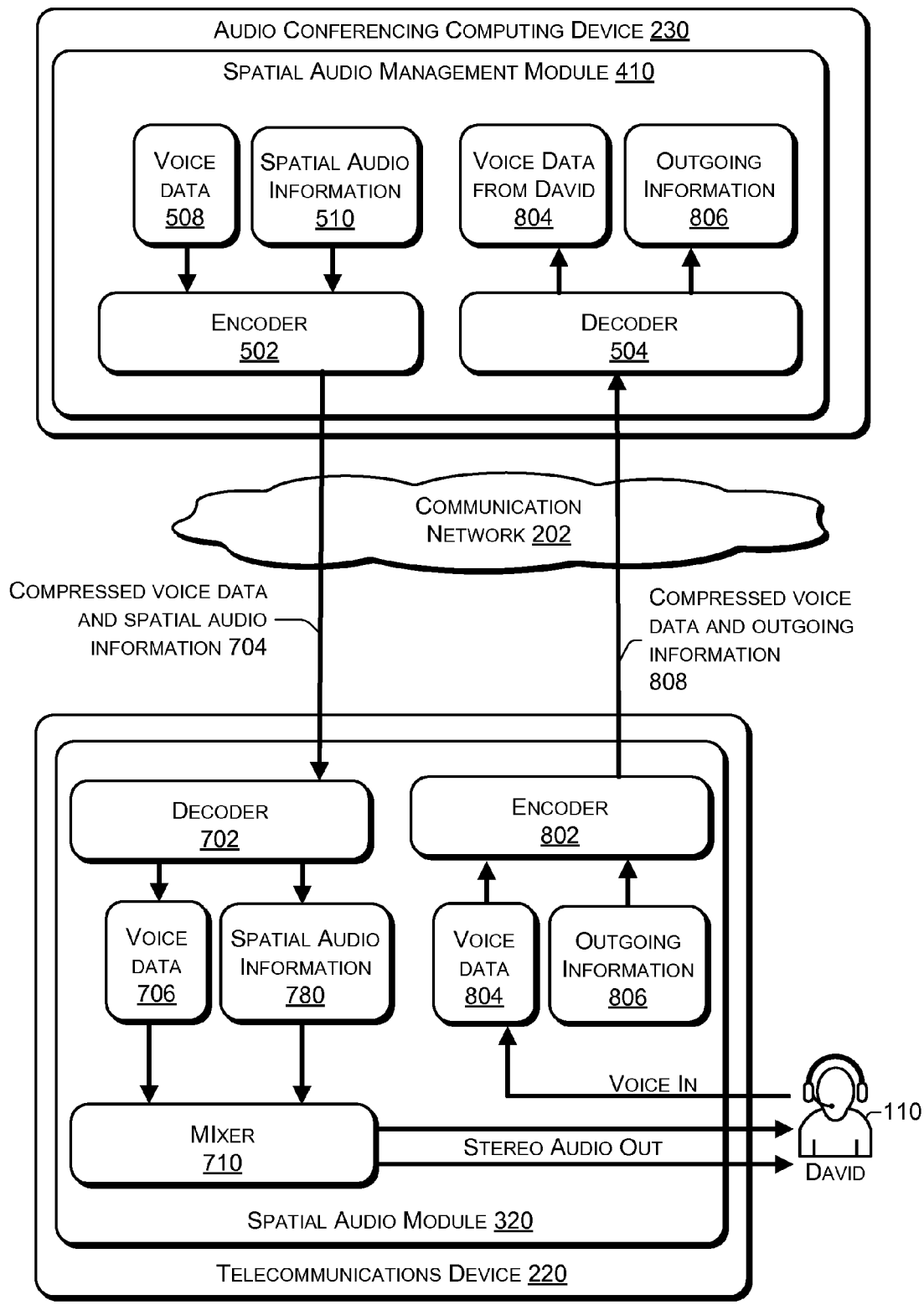
FIG. 8 illustrates an exemplary implementation of interaction between the spatial audio management module and the spatial audio module according to some implementations.

FIG. 8 illustrates a conceptual block diagram of an additional implementation for enabling spatial audio to telecommunications devices. In the example of FIG. 8, the telecommunications device 220 includes an encoder 802 for encoding voice data 804 received from participant David 110 at telecommunications device 220. Spatial audio module 320 may also encode outgoing information 806 such as virtual position information with the voice data 804 for transmission to audio conferencing computing device 230 during the audio conference as compressed voice data and information 808. For example, outgoing information that can be transmitted from the telecommunications device 220 to the audio conferencing computing device 230 includes the positions of the images of the participants to the audio conference, as represented in the GUI 302 of FIG. 3. These positions can be transmitted to the audio conferencing computing device as part of an audio watermark embedded in the compressed voice data 808 transmitted from the telecommunications device 220. Accordingly, with this capability, if David does not like the virtual positions of the participants to the audio conference, he can rearrange their positions using the GUI 302, and this new position data can be transmitted to the audio conferencing computing device 230 as outgoing information 806 so that the spatialized audio calculations carried out by the audio conferencing computing device 230 can be adjusted accordingly.

In additional implementations, this technique may be used to effectuate a virtual head turn. For example, referring to the GUI 302 of FIG. 3, if Alex is speaking, David might use the GUI 302 to slide the image 304 of Alex to the center position on the GUI 302, while the images of Bob 306 and Carly 308 are pushed to the right. This participant repositioning information can be transmitted to the audio conferencing computing device 230 via an audio watermark, so that the spatial audio calculations carried out by spatial audio management module 410 can be adjusted to cause the audio from Alex to appear to come from the center and the audio from Bob and Carly to appear to come from the right side. Other information may also be transmitted to audio conferencing computing device 230 as outgoing information 806 via an audio watermark during the audio conference.

In addition, it should be noted that in the implementations in which the spatial audio calculations are performed on the telecommunications device 220 based on a received identity of a speaker, a similar virtual head turn can be effected using GUI 302. However, it is not necessary to transmit participant repositioning information to the audio conferencing computing device 230 in these implementations. Instead, the spatial audio module 320 on the telecommunications device receives the repositioning information from the GUI 302, and is able to adjust the spatial audio in real time to change the direction from which the audio appears to be coming.

Audio Conferencing Computing Device Processing

Figure 9:
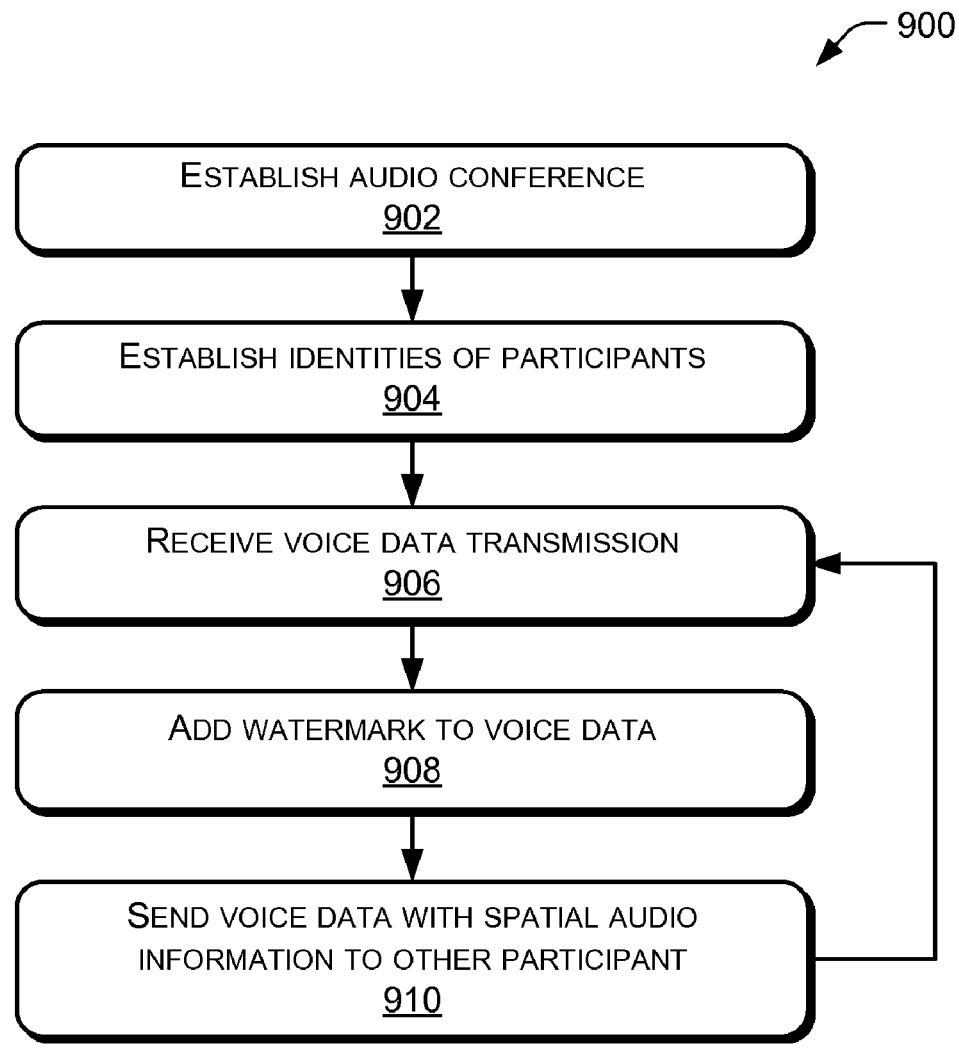
FIG. 9 illustrates a flowchart of an exemplary process carried out by the audio conferencing computing device for providing spatialized audio according to some implementations.

FIG. 9 illustrates an exemplary process 900 implemented on audio conferencing computing device 230 for carrying out some of the implementations described herein. Process 900 may be implemented by processor(s) 402 executing instructions for spatial audio management module 410 and audio conferencing module 412 stored in memory 404 of audio conferencing computing device 230.

At block 902, an audio conference is established on audio conferencing computing device 230. For example, as discussed above, one of the participants can send an SMS message to audio conferencing computing device 230 to indicate a desired time for the audio conference, a number of participants, identities of the participants, and/or other relevant information. Audio conferencing computing device 230 can then establish a call-in number for the audio conference and provide this call-in number along with other information about the audio conference to all the identified participants. The information can be provided to the participants by SMS message, e-mail, automated voice calling/messaging, or the like. Additionally, the participant establishing the audio conference can provide images of each of the participants, or the audio conferencing computing device can have images of each participant stored, such as according to telephone number, name, or the like. The audio conferencing computing device provides these images of each of the participants to the other participants by MMS message or the like. The spatial audio module 320 can place these images on the display of GUI 302 when each participant joins the conference and is identified. After the audio conference has been set up, then, at the appointed time, the participants to the audio conference dial the provided call-in number to join the audio conference, or the audio conferencing computing device dials the identified participants to establish the audio conference. Further other methods of establishing an audio conference may also be used, as is known in the art, and the implementations herein are not limited to any particular method for establishing the audio conference.

At block 904, when the audio conference is established, the identities of the participants are determined. For example, audio conferencing computing device 230 may use any known method for determining the identities of the participants that have called in, such as caller ID, packet reading, or the like. Alternatively, the computing device may request that each party identify itself such as verbally or by entering one or more of numbers. Further, if the audio conferencing computing device called the participant, then the identity of the participant will already be known. Still alternatively, the computing device may randomly assigned identities to each participant. Other methods of identifying participants will also be apparent to those of skill in the art. Furthermore, in some implementations, the audio conferencing computing device 230 will at this point receive the desired virtual positions of the participants on a particular participant's graphic user interface 302, such as described above in FIG. 8.

At block 906, during the audio conference, voice data is received at the audio conferencing computing device 230 when one or more of the participants in the conference speak. As described above with reference to FIG. 5, voice data received from the participant that is speaking is decoded by the decoder 502 at audio conferencing computing device 230.

At block 908, based upon the voice data that is received, spatial audio information is created and combined with the voice data by encoder 504. For example, the spatial audio information is encoded as an audio watermark embedded in the range of 0-300 Hz of the encoded voice data. In some implementations, the spatial audio information may contain only the identity of the participant that corresponds to the source of the voice data. In other implementations, the spatial audio information may contain only a relative or absolute virtual position of the speaker. In other implementations, the position of the speaker is transmitted in the watermark. For example, the audio conferencing computing device 230 determines the virtual position of the speaker, and transmits this position information in the watermark. This may be a relative position or angle relative to the receiving party, or an absolute position or angle when the position of each party is fixed by the audio conferencing computing device 230. In yet other implementations, when audio conferencing computing device 230 performs the spatial audio calculations, as described above, then the difference between the left audio channel and right audio channel desired to create the illusion of a perceived position of the speaker is calculated and added as the audio watermark information to the encoded voice data. In some implementations, these calculations are made based upon the virtual position information that the audio conferencing computing device 230 has for each of the participants. The virtual position information can be based upon the relative positions of the information for each participant on the GUI 302 of the listening participant's telecommunications device 230. In other implementations, where the positioning has been randomly established or fixed by the audio conferencing computing device 230, the audio conferencing computing device 230 maintains track of the virtual positions of the participants, and when the position of each party is established, can also transmit this position information in the watermark to the telecommunications devices so that the relative positions of the participants can be displayed on the GUI 302.

At block 910, the voice data and the spatial audio information are forwarded to the respective telecommunications devices of the participants. Any telecommunications devices that are configured to produce spatial audio can receive the voice communication and spatial audio information, and the spatial audio modules on those devices will proved the spatial audio as discussed above. Accordingly, if all participants have spatial audio-enabled telecommunications devices, then each will be able to receive the voice data with the embedded watermark. Further, as discussed above, when one or more of the participants has a conventional landline phone or other device that does not support stereo audio or that does not include audio processing capability, then that device is still able to receive the voice data with the embedded watermark with virtually no loss of quality.

Telecommunications Device Processing

Figure 10:
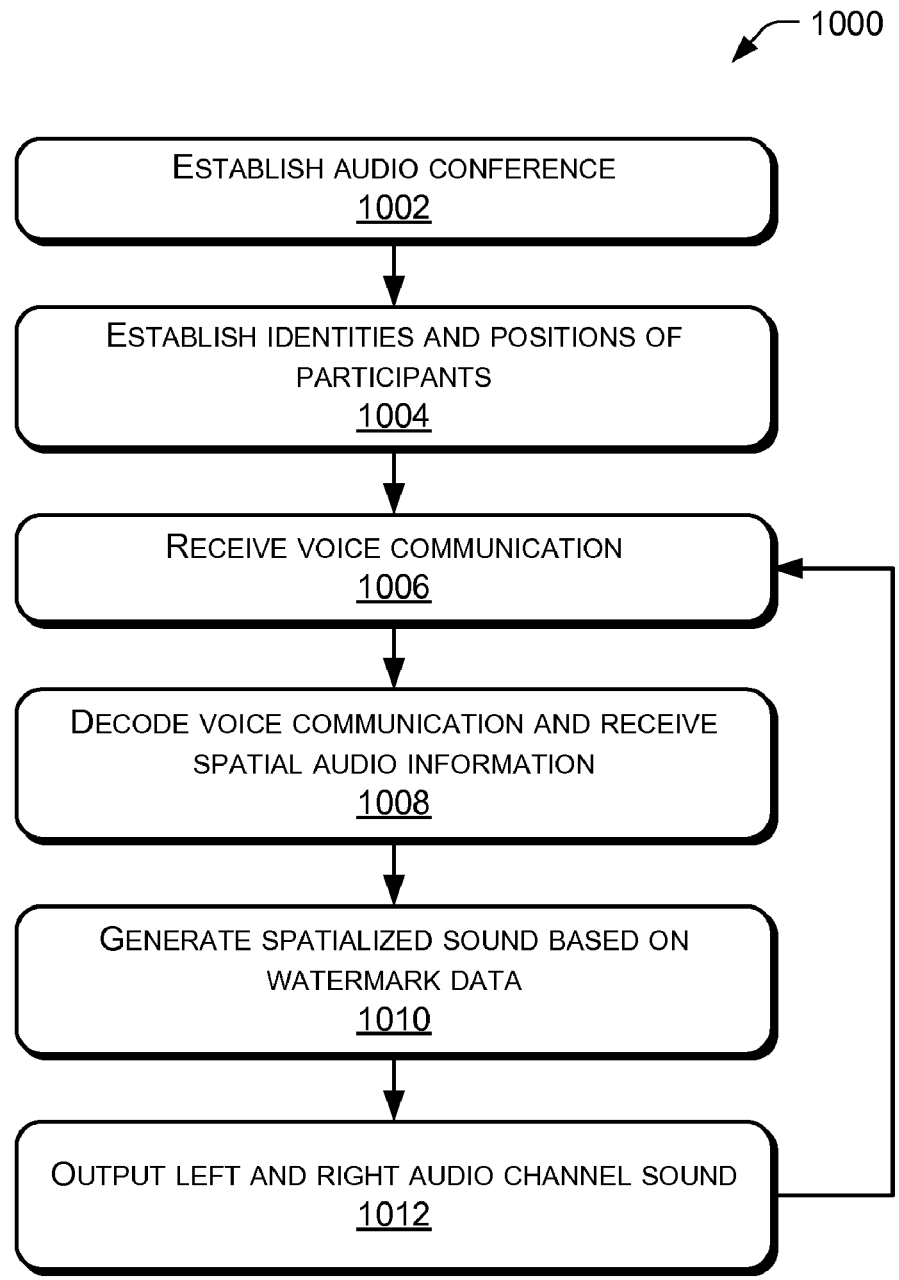
FIG. 10 illustrates a flowchart of an exemplary process carried out by the telecommunications device according to some implementations.

FIG. 10 illustrates an exemplary process 1000 implemented on telecommunications device 220 for carrying out some of the implementations described herein. Process 1000 may be implemented by processor(s) 310 executing instructions for spatial audio management module 320 stored in memory 312 of telecommunications device 220.

At block 1002, the audio conference is established, as discussed above. For example, the audio conference may be established by the user of telecommunications device 220 calling in to the audio conferencing computing device 230 at the appointed time. Furthermore, in some implementations, the GUI 302 of spatial audio module 320 may include a function that facilitates automatic establishment of the audio conference. In these implementations, the user may activate the spatial audio module 320 and use the GUI 302 to set up the audio conference by indicating a desired time and date for the audio conference, a number of participants, identities of the participants, and the like. This information can then be sent by spatial audio module 320 to the audio conferencing computing device 230, for instance, by SMS message, MMS message, e-mail, or the like. Upon receipt of this information, the audio conferencing computing device 230 can set up the audio conference and provide notification of the time and date of the audio conference, the telephone number to call in to, and other information to the identified participants of the audio conference. Other implementations for establishing an audio conference will also be apparent to those of skill in the art in light of the disclosure here in.

At block 1004, when connection to the audio conference has been established by the telecommunications device 220, the user can use the GUI 302 to indicate relative positions of each of the participants to the audio conference. For example, as each participant joins in the audio conference, the telecommunications device can receive the identity of each participant from the audio conferencing computing device 230 via an audio watermark, or the like. Spatial audio module 320 can then automatically place information for the added participant on the graphic user interface. For example, the name of the participant, the telephone number of the participant, and/or a stored image of the participant may be placed on the graphic user interface 302 automatically as each participant joins. The user may further control or rearrange placement of the images and information for each of the participants. Alternatively, however, in other implementations, the positions of the participants do not have to be displayed at all on the display 300 of telecommunications device 220. Spatial audio can still be provided without such a display, and still be useful, because having the sound appear to come from a particular different direction for each particular different participant still aids the user in identifying which of the participants is speaking.

At block 1006, during the audio conference, voice communications are received by the telecommunications device. As discussed above, these voice communications can include an audio watermark containing the spatial audio information for producing spatial audio on the telecommunications device 220. For example, in some implementations, the spatial audio information might only include identity information for the participant corresponding to the voice data included with the watermark. In other implementations, the spatial audio information includes difference information calculated by the audio conferencing computing device for the left and right audio channels to be generated by the audio interface at the telecommunications device. In other implementations, the spatial audio information might only include relative or absolute virtual position information of the participant that is speaking. Processing for each of these implementations is discussed further below. In yet other implementations, the spatial audio information might be received by a separate data channel or via an SMS message that is automatically processed by the spatial audio module.

At block 1008, the received voice communication is decoded and the spatial audio information is received. For example, as discussed above, spatial audio module 320 uses a codec to decompress and decode the received voice communication to produce uncompressed voice data. Spatial audio module can further extract watermark data from the compressed voice communication to receive the spatial audio information. Alternatively, the spatial audio can be received in another manner, as discussed above.

At block 1010, spatial audio module 320 uses the spatial audio information to calculate spatialized sound for the voice data corresponding to the spatial audio information. Spatial audio module generates left and right audio channels for the voice communication based upon the spatial audio information received with the voice communication. As discussed above, directional spatialized audio can be produced in a variety of ways, such as, for example, producing a time delay in one of the audio channels. The implementations herein are not limited to any particular method for producing spatialized audio effects.

At block 1012, spatial audio module provides the generated left and right audio channel signals to the audio interface of the telecommunications device for producing stereo sound having a spatial audio effect corresponding to a direction of the virtual location of the particular participant that is the origin of the voice communication. The spatial audio module then proceeds with processing the next voice communication received.

Figure 11:
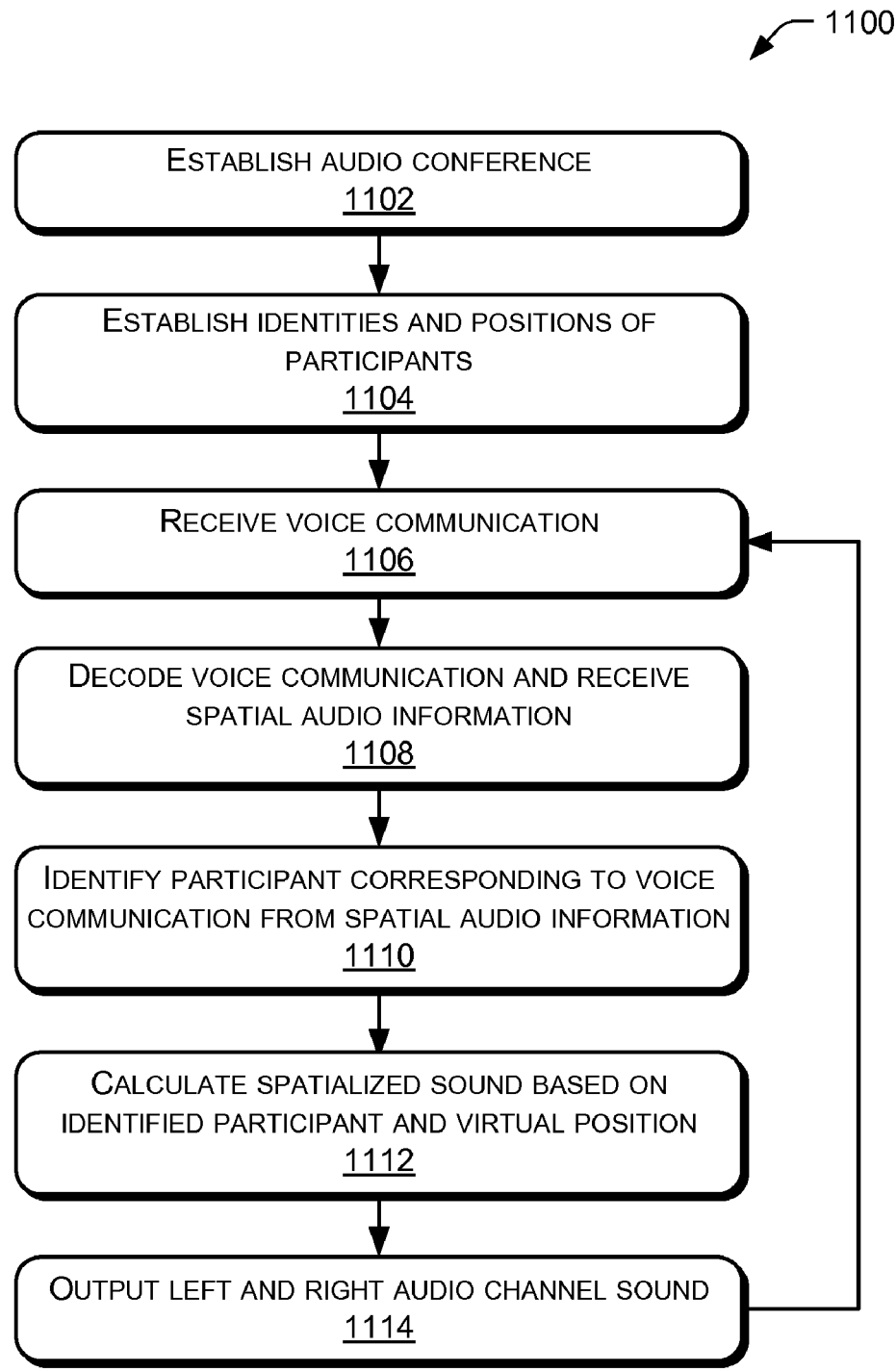
FIG. 11 illustrates a flowchart of an exemplary process carried out by the telecommunications device when receiving identity information according to some implementations.

FIG. 11 illustrates another exemplary process 1100 implemented on telecommunications device 220 for carrying out the implementations described above in which the audio conferencing computing device provides only identity information of a speaking participant, and the telecommunications device 220 keeps track of virtual positions of the participants and performs calculations for determining spatial audio effects for the participant that is speaking. Process 1100 may be implemented by processor(s) 310 executing instructions for spatial audio management module 320 stored in memory 312 of telecommunications device 220.

At block 1102, connection to the audio conference is established, as discussed above with reference to block 1002 of FIG. 10.

At block 1104, when connection to the audio conference has been established through the telecommunications device 220, the user can use the graphic user interface 302 to indicate relative positions of each of the participants to the audio conference. For example, as each participant joins in the audio conference, the telecommunications device 220 can receive the identity of each participant from the audio conferencing computing device 230, such as via an audio watermark, SMS message, MMS message, or the like. Spatial audio module 320 can then automatically place information for the added participant on the graphic user interface 302. For example, the name of the participants, the telephone numbers of the participants, and/or a stored image of each participant may be placed on the graphic user interface 302 automatically. In other implementations, the user may control placement of the information and/or image for each of the participants. For example, the user may rearrange the positions of the participants at any time during the audio conference and have the direction of the sound of that participant's voice be changed dynamically to correspond to the new virtual position. Alternatively, however, in other implementations, the positions of the participants do not have to be displayed at all on the display 300 of telecommunications device 220. Spatial audio can still be provided without such a display, and still be useful, because having the sound appeared to come from a particular direction for a particular participant still aids the user in identifying which of the participants is speaking.

At block 1106, during the audio conference, voice communications are received by the telecommunications device 220. As discussed above, these voice communications can include an audio watermark containing spatial audio information for producing spatial audio on the telecommunications device 220. In these implementations, the spatial audio information might only include identity information for identifying the participant that is speaking, i.e., the participant that corresponds to the source of the voice data that the spatial audio information accompanies.

At block 1108, the received voice communication is decoded and the spatial audio information is received. For example, as discussed above, spatial audio module 320 uses a codec to decompress and decode the received voice communication to produce uncompressed voice data. Spatial audio module further receives the spatial audio information. In implementations herein, the spatial audio data can be included in an audio watermark transmitted with the corresponding voice data. In these implementations, the spatial audio information received contains identifies the participant that is the origin of the corresponding voice data, i.e., the participant that is speaking. Further, while implementations herein have described the spatial audio data as being transmitted in an audio watermark, in other implementations, the spatial audio data may be sent by other methods, such as through a separate data channel (e.g., using Internet Protocol), through an SMS message, or the like.

At block 1110, the spatial audio module 320 uses the spatial audio data received to identify which participant of the audio conference is the source of the accompanying voice communication, and to determine the virtual position of the identified participant. For example, when each participant is represented on the GUI 302, the virtual position of the identified participant is determined and this determined virtual position is used for carrying out the spatial audio calculations. When the GUI is not used, a designated virtual position for each participant may be tracked using a table, or other data structure.

At block 1112, spatial audio module 320 uses the spatial audio information and the determined virtual position to calculate spatialized sound effect for the voice data corresponding to the received spatial audio information. Spatial audio module 320 generates left and right audio channels for the monaural voice data based upon the identity information and the designated virtual location of the identified participant relative to the virtual position of the telecommunications device 220. As discussed above, spatialized audio that can be produced in a variety of ways such as for example producing a time delay in one of the audio channels. The implementations herein are not limited to any particular method for producing spatialized audio effects.

At block 1114, spatial audio module provides the generated left and right audio channel signals to the audio interface 328 of the telecommunications device 220 for producing stereo sound having a spatial directional audio effect corresponding to the virtual location of the particular participant that is identified as the source of the voice communication. The spatial audio module then proceeds with processing the next voice communication received.

Figure 12:
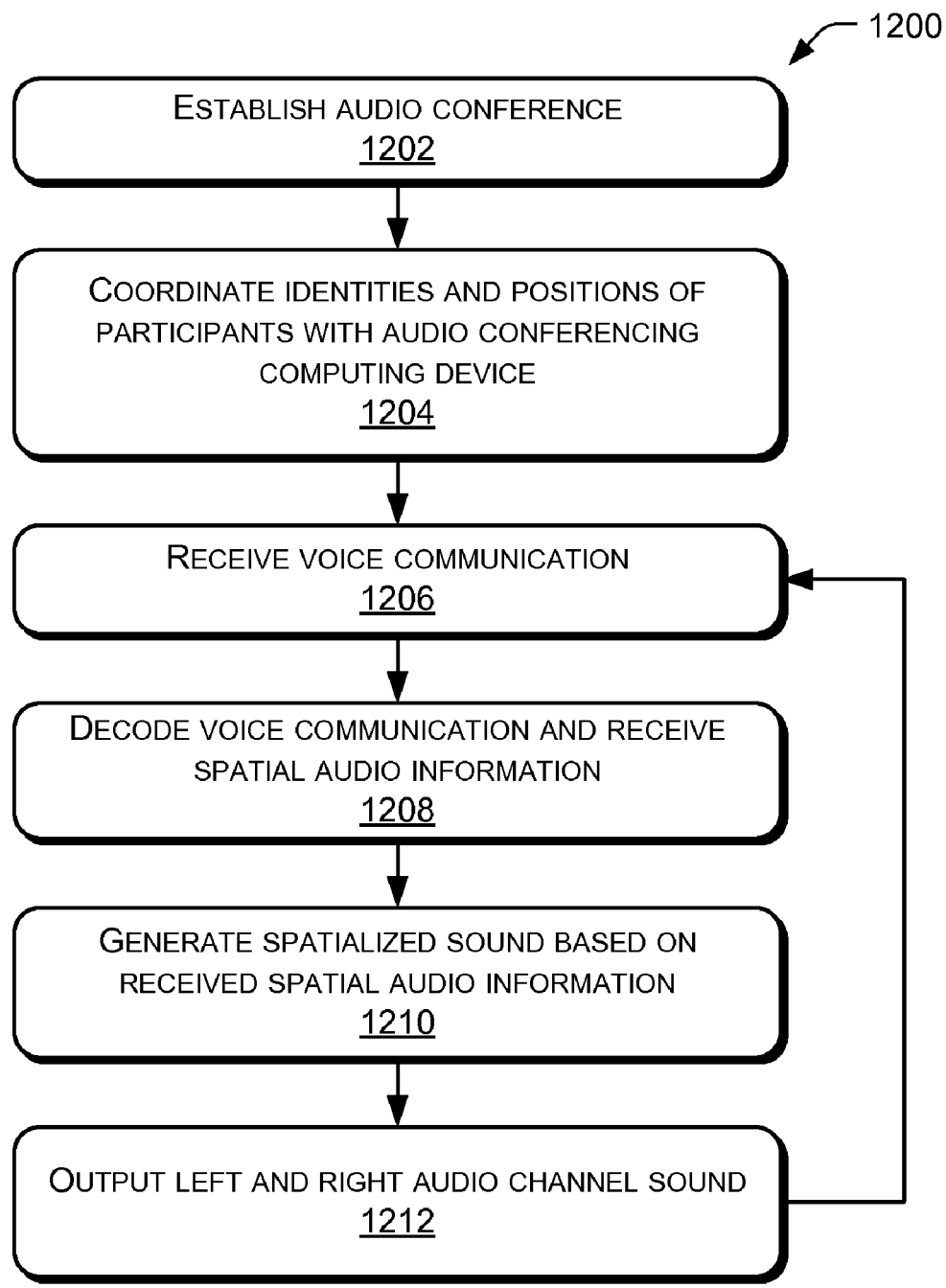
FIG. 12 illustrates a flowchart of an exemplary process carried out by the telecommunications device when receiving audio difference information according to some implementations.

FIG. 12 illustrates an exemplary process 1200 implemented on telecommunications device 220 for carrying out the implementations in which the audio conferencing computing device keeps track of virtual positions of the participants and performs calculations for determining spatial audio effects for the participant that is speaking. Process 1200 may be implemented by processor(s) 310 executing instructions for spatial audio management module 320 stored in memory 312 of telecommunications device 220.

At block 1202, connection to the audio conference is established in the manner described above with respect to block 1002 of FIG. 10.

At block 1204, the identities and positions of the participants established on the GUI 302 of the telecommunications device 220 are coordinated with the audio conferencing computing device 230. For example, as discussed above, in some implementations, the user establishes the positions of the participants using the GUI 302. Furthermore, position information of the participants relative to each other on the GUI 302 can be transmitted to the audio conferencing computing device 230 from the telecommunications device 220 by including the information in an audio watermark attached to a voice communication from the telecommunications device 220. In other implementations, the audio conferencing computing device may establish the position of each of the participants based upon a random order, an order of call-in, a designated order of importance, or the like, and then transmit this information to the telecommunications device via an audio watermark, or the like. In other implementations, the position information may be transmitted by an SMS message, MMS message, or the like. Further, in the case of users that have MMS enabled devices, an image of each participant having an MMS enabled device may be provided to the audio conferencing computing device, and the audio conferencing computing device may uses MMS messages to distribute these images of the participants to each of the other participants upon the other participants joining the audio conference for placement of the images on the graphic user interfaces of each of the participants having a spatial audio module enabled on their telecommunications device.

At block 1206, the telecommunications device receives a voice communication containing voice data and corresponding position information or spatial audio information that was calculated by the audio conferencing computing device based upon the virtual positions of each of the participants relative to the speaking participant.

At block 1208, the received voice communication is decoded and the spatial audio information is received. For example, as discussed above, spatial audio module 320 uses a codec to decompress and decode the received voice communication to produce uncompressed voice data. Spatial audio module further receives the spatial audio information. In implementations herein, the spatial audio data can be included in an audio watermark transmitted with the corresponding voice data. In some implementations, the spatial audio information received may contain difference information between the left and right audio channels calculated by audio conferencing computing device 230 for the particular virtual position of the participant that is the origin of the corresponding voice data. As discussed above, the difference information may be calculated based upon a time delay, a decreased gain of one of the channels, or other methods, as are known in the art. In other implementations, the spatial audio information may specify a position of the speaking participant, such as a virtual position relative to the virtual position of the receiving party, or an absolute virtual position relative to virtual positions established for all the participants. Further, while implementations herein have described the spatial audio data as being transmitted in an audio watermark, in other implementations, the spatial audio data may be sent by other methods, such as through a separate data channel (e.g., using Internet Protocol), through an SMS message, or the like.

At block 1210, spatial audio module 320 generates spatialized sound based upon the received spatial audio information. For example, spatial audio module 320 uses the difference information provided by the audio conferencing computing device 230 to generate a left audio channel and a right audio channel from the received monaural voice data based upon the difference information.

At block 1212, spatial audio module 320 provides the generated left and right audio channel signals to the audio interface 328 of the telecommunications device 224 for delivery to the stereo headset 332 or speakers 334, 336 of the telecommunications device 220.

Exemplary Module Implementations

The modules described above, including spatial audio module 320, spatial audio management module 410, and audio conferencing module 412, can be employed in many different environments and situations for audio conferencing. Generally, any of the functions described with reference to the figures can be implemented using software, hardware (e.g., fixed logic circuitry), manual processing, one or more particular machines, or a combination of these implementations. The term "logic, "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that performs specified tasks when executed on a processing device or devices (e.g., CPUs or processors). The program code can be stored in one or more computer-readable memory devices or media. Thus, the methods and modules described herein may be implemented by a computer program product. The computer program product may include computer-readable storage media having a computer-readable program code embodied therein. The computer-readable program code is adapted to be executed by one or more processors to implement the methods and/or modules of the implementations described herein. The terms "computer-readable storage media", "processor-accessible storage media", or the like, refer to any kind of machine storage medium for retaining information, such as a the various kinds of storage devices discussed above.

FIGS. 3 and 4 illustrate telecommunications and computing devices and functionalities 220, 230 that can be used to implement the modules described herein. As discussed above, these devices 220, 230 include one or more processors, memories, and communication interfaces. Some implementations can further include displays, other input/output (I/O) devices, mass storage devices, and the like. Memories 312, 404 are examples of computer-readable storage media described above for storing instructions which perform the various functions described above when executed by the processing devices 310, 402. The telecommunications and computing devices described herein are only examples of suitable devices, and are not intended to suggest any limitation as to the scope of use or functionality of the implementations described herein for providing spatial audio. Further, reference in the specification to "one implementation", "this implementation", "these implementations" "some implementations" or "implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

Conclusion

From the foregoing, it may be seen that implementations herein provide audio spatialization techniques that are functional with existing telephone networks, protocols and telecommunications devices. In some implementations, audio spatialization information is transmitted as part of the voice channel transmission. For example, audio spatialization information is transmitted as an audio watermark embedded in the voice channel data, which can be decoded by the telecommunications device for providing spatialization of the corresponding voice data at a stereo-enabled telecommunications device. Because the spatial audio information transmitted with the voice data is undetectable to human hearing, the techniques describe are backwards compatible with existing telecommunications devices, such as conventional landline telephones or other non-stereo telecommunications devices or devices lacking sound-processing capability.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. A computer readable storage device having computer readable program code embodied therein, the computer-readable program code to be executed by one or more processors to perform acts comprising:
   establishing a virtual position of each participant to an audio conference relative to one or more other participants of the audio conference by displaying information for each participant in a graphic user interface on a display of a telecommunications device connected to the audio conference;
   receiving, at the telecommunications device, a voice communication containing voice data originating from a particular participant of the audio conference, the voice data including an audio watermark encoded at a frequency between 0 and 300 Hz;
   decoding the voice data received by extracting the audio watermark;
   determining spatial audio information and monaural voice data from the audio watermark; and
   applying the spatial audio information to the monaural voice data to produce spatialized audio comprising a left audio channel signal and a right audio channel signal, wherein the spatialized audio is spatialized to appear to come from a direction corresponding to the virtual position of the particular participant that is a source of the corresponding voice data, as established on the graphic user interface of telecommunications device.

2. The computer readable storage device according to claim 1, wherein the spatial audio information determined from the audio watermark extracted from the voice data includes an identity of the particular participant that is the source of the corresponding voice data.

3. The computer readable storage device according to claim 1, wherein the spatial audio information determined from the audio watermark extracted from the voice data includes difference information between the left audio channel signal and the right audio channel signal calculated by an audio conferencing computing device that forwarded the voice data, or a virtual position of the particular participant that is the source of the corresponding voice data.

4. A method implemented by a telecommunications device, the method comprising:
   receiving voice data at the telecommunications device, the voice data corresponding to a first participant of multiple audio conference participants, the voice data including an audio watermark encoded at a frequency between 0 and 300 Hz;
   receiving spatial audio information corresponding to the voice data, the spatial audio information determined from the audio watermark; and
   applying the spatial audio information to the voice data to generate a left spatialized audio signal and right spatialized audio signal based upon a determined virtual position of the first participant.

5. The method according to claim 4, wherein the spatial audio information corresponding to the voice data received includes an identity of the first participant, identifying the first participant as a source of the corresponding voice data.

6. The method according to claim 4, wherein the spatial audio information received corresponding to the voice data includes difference information between the left spatialized audio signal and the right spatialized audio signal calculated by an audio conferencing computing device that sent the voice data.

7. The method according to claim 4, further comprising establishing a virtual position for each of the multiple participants to the audio conference relative to the other participants of the audio conference by placing information for each participant in a graphic user interface on a display of the telecommunications device.

8. The method according to claim 7, further comprising rearranging the virtual positions of the multiple participants to the audio conference by rearranging the positions of the information for each participant on the graphic user interface, wherein spatialized audio produced for each participant is adjusted based upon the rearranged virtual positions.

9. The method according to claim 4, wherein the left spatialized audio signal and right spatialized audio signal are generated based upon the determined virtual position of the first participant by applying a time delay to one of the left or right spatialized audio signals to cause the voice data to appear to come from a direction corresponding to the determined virtual position of the first participant relative to a virtual position of the telecommunications device.

10. The method according to claim 4, further comprising:
    sending a voice communication from the telecommunications device to an audio conferencing computing device managing the audio conference; and
    including outgoing information in the voice communication to the audio conferencing computing device, wherein the outgoing information is included in an audio watermark attached to the voice communication.

11. The method according to claim 4, further comprising establishing the audio conference by sending an SMS (short message service) message to an audio conferencing computing device, wherein the SMS message specifies a time and date for establishing the audio conference.

12. A computer-readable storage device storing computer readable program code, the computer-readable program code executable by one or more processors to implement the method of claim 4.

13. A system comprising:
    a computing device having one or more processors coupled to a computer readable storage device storing instructions to be executed by the one or more processors for configuring the computing device to:

establish an audio conference for enabling audio communications between a plurality of telecommunications devices;

receive voice data from a first telecommunications device of the plurality of telecommunications devices, the voice data including an audio watermark encoded at a frequency between 0 and 300 Hz;

determine spatial audio information for a first telecommunications device that is a source of the voice data, the spatial audio information determined from the audio watermark; and forward the voice data and the spatial audio information to other telecommunication devices of the plurality of telecommunications devices.

14. The system according to claim 13, wherein the computing device is further configured to include the audio watermark encoded with the voice data when the voice data is forwarded to the other telecommunication devices.

15. The system according to claim 13, wherein the computing device is further configured to send the spatial audio information as an SMS (short message service) message or as a data message sent through a data connection to one or more of the other telecommunications devices.

16. The system according to claim 13, wherein the computing device is further configured to:

prior to establishing the audio conference, receive an SMS message from one of the telecommunications devices, wherein the message specifies a desired time, date, and identities of participants for the audio conference; and send, to the telecommunications devices of identified participants of the audio conference, messages informing the identified participants of information regarding the audio conference.

17. The system according to claim 13, wherein the computing device is further configured to:

determine virtual positions for the plurality of telecommunications devices party to the audio conference; and determine the spatial audio information by calculating difference information between a left spatialized audio signal and a right spatialized audio signal for the virtual position of the first participant; and include the difference information as the spatial audio information forwarded to the other telecommunications devices.

18. The system according to claim 13, wherein the computing device is further configured to:

determine an identity or virtual position corresponding to the first telecommunications device; and include the identity or a virtual position determined as the spatial audio information forwarded to the other telecommunications devices.

19. The computer readable storage device according to claim 1, further comprising establishing a virtual position for each participant to the audio conference relative to the one or more other participants of the audio conference by placing information for each participant on the graphic user interface.

20. The computer readable storage device according to claim 19, further comprising rearranging the virtual position for each participant to the audio conference by rearranging the positions of the information for each participant on the graphic user interface, wherein the spatialized audio produced for each participant is adjusted based upon the rearranged virtual positions.

* * * * *